INVENTORS
EDWARD A. ANDERSON
CECIL W. WALTON
BY
ATTORNEYS

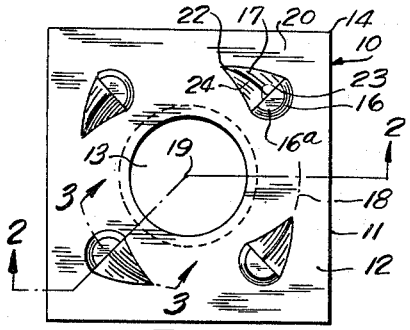
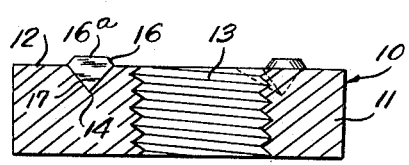
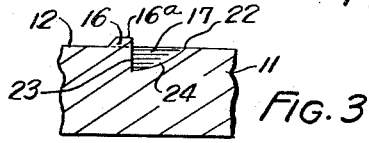
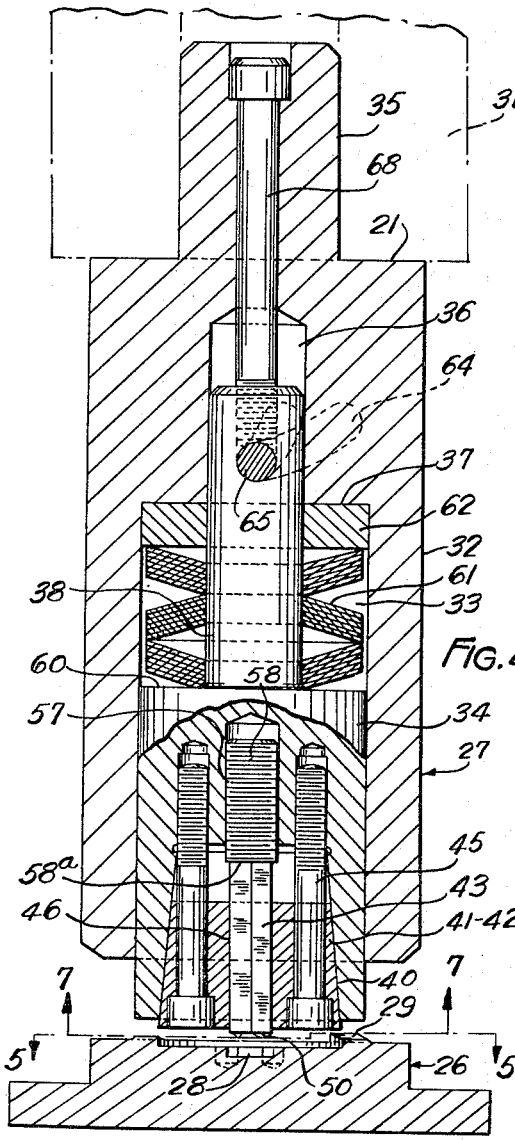
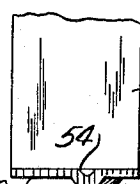
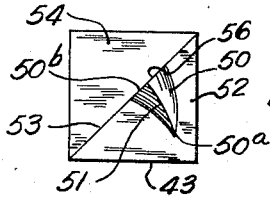

United States Patent Office 3,001,214
Patented Sept. 26, 1961

3,001,214
METHOD AND APPARATUS FOR FORMING WELDING PROJECTIONS ON A NUT BLANK
Edward A. Anderson, Cleveland Heights, and Cecil W. Walton, Lakewood, Ohio, assignors to The Lamson & Sessions Company, Cleveland, Ohio, a corporation of Ohio
Filed Dec. 19, 1958, Ser. No. 781,702
4 Claims. (Cl. 10—72)

This invention relates to the manufacture of weld nuts of the kind having projections thereon for facilitating the attachment of the nuts to a support by welding.

Various forms of weld nuts have been made and used heretofore but, in the main, have been more costly than is desirable to the trade. The objectionable cost of the previously available weld nuts has usually resulted either from the form of the nut being complex or otherwise difficult to produce, or from the fact that the dies used in the production thereof have only a relatively short life and are therefore costly to maintain.

The present invention accordingly provides a novel weld nut of an extremely simple form adapted to be produced rapidly and economically, and also provides a novel method for making the nut as well as novel die apparatus for carrying out the method.

More specifically, this invention provides a novel weld nut having welding projections or lugs formed by gouged-out portions of the metal of the body of the nut.

As a further object thereof the invention provides a novel method of making weld nuts which comprises displacing a portion of the metal of the nut body by gouging a recess therein and gathering or upsetting the displaced metal into a welding lug during the gouging step. The novel method contemplates the performance of the gouging step by a combined rotative and axial penetration of a gouge-forming tool element into the nut body.

As still another object thereof, this invention provides novel die apparatus for forming weld nuts and comprising relatively rotatable punch and workholder members for rotatively penetrating a gouging element, or a group of such elements, into a nut body for displacing and upsetting portions of the metal of the body to form the welding lugs.

Other objects and advantages of this invention will be apparent in the following detailed description and in the accompanying drawings forming a part of this specification and in which, FIG. 1 is a plan view of one end of a weld nut embodying this invention and produced by the method and apparatus thereof;

FIG. 2 is an axial section taken through the nut on section line 2—2 of FIG. 1;

FIG. 3 is a fragmentary axial section taken through one of the welding lugs and its associated recess as indicated by section line 3—3 of FIG. 1;

FIG. 4 is an axial section taken through die apparatus provided by this invention for producing the weld nut shown in FIG. 1, the view being taken as indicated by the section line 4—4 of FIG. 7;

FIG. 7 is a bottom view of the punch member, the view being taken as indicated by the directional line 7—7 of FIG. 4;

FIG. 12 is a partial side elevation of one of the gouging dies of the punch member; and FIG. 13 is an end view of the gouging die of FIG. 12.

Figure 8:
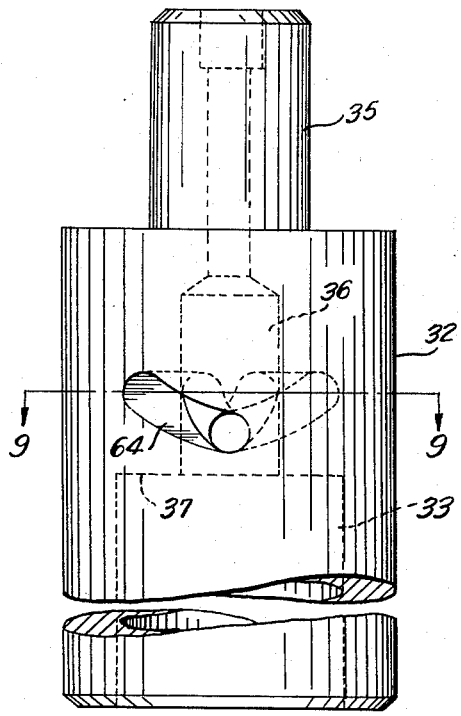
FIG. 8 is a side elevation of the body or socket component of the punch member in detached relation.
Figure 9:
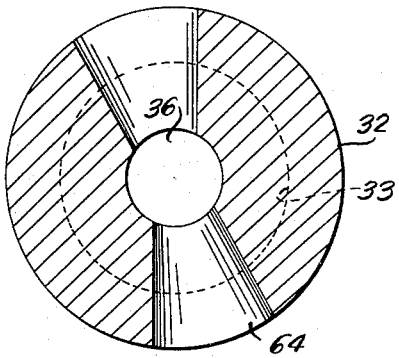
FIG. 9 is a transverse section taken through the socket component on section line 9—9 of FIG. 8.

The weld nut 10 provided by this invention is shown in FIGS. 1, 2 and 3 of the drawings and will be described first. The weld nut 10 comprises a metal body 11 having a flat end face 12 on at least one end thereof and a threaded tap opening 13 extending axially into the body substantially centrally of the end face 12. The body 11 is preferably of a polygonal peripheral contour and, in this case, is of a quadrangular plan shape having four corners 14.

In accordance with the present invention the body 11 is provided with welding projections or lugs 16, in this instance an annular group of such lugs, disposed in a surrounding relation to the tap opening 13 and formed by metal displaced from gouged recesses 17 associated with such lugs. The welding lugs 16 project axially from the metal body 11 and rise above the flat end face 12 thereof. The lugs 16 serve the purpose of concentrating the welding pressure and the welding current in a corresponding group of relatively small areas when the nut is being attached to its support by a welding operation, as is understood by those skilled in this art.

The recesses 17 are formed in the end face 12 by a method procedure and die apparatus which will be described in detail hereinafter and, as shown in FIGS. 1 and 3, are arcuately extending recesses lying on a circle 18 at spaced points along the circumference thereof. The recesses 17 are distributed symmetrically about the axis 19 of the tap opening 13 and lie in the included-angle areas 20 of the corners 14 of the nut body.

As shown in FIGS. 1 and 3 of the drawings, the recesses 17 are of a substantially triangular plan shape each having an apex 22 at one end thereof and a base 23 at the other end thereof. The recesses are disposed on the circle 18 so that the bases 23 all face in the same direction around the circle, and the recesses are of a progressively varying depth which increases axially of the nut body 11 from the apex or shallow end 22 toward the deep end or base 23. The recesses 17 are of a substantially V-like cross-sectional shape with the ridge 24 of the V-shape at the bottom of the recess and lying on the circle 18.

Each of the welding lugs 16 is formed by metal displaced from the metal body 11 by the formation of the associated recess 17 and which metal has been gouged from the recess and has been gathered by being pushed up into an upset lug at one end of the recess. The lug 16 is located at the base end of the triangular recess 17 and extends above the end face 12 as shown in FIGS. 2 and 3 and is preferably provided with a flat top 16ᵃ. The displaced metal from which the welding lug 16 is formed is gouged metal which has been pushed along the recess 17 lengthwise thereof by one of the gouge-forming portions of the die apparatus to be described hereinafter. The flat tops 16ᵃ of the group of lugs 16 lie in a common plane which is spaced above and parallel to the end face 12.

The die apparatus provided by this invention for producing the weld nut 10 is shown in FIG. 4 and comprises co-operating workholder and punch unit members 26 and 27 which have relative closing and opening movements as well as relative rotary movements therebetween for operating on the nut body 11. The workholder member 26 is here shown as being a relatively stationary member adapted to be mounted on the bed or bolster plate of a conventional punch press or other suitable power apparatus. The workholder member 26 is provided substantially centrally thereof with a pocket 28 of a size and shape to receive a nut body, in this case, a pocket of a quadrangular or square shape to correspond with the quadrangular or square shape of the nut body 11. The pocket 28 is of a suitable depth in relation to the axial thickness of the nut body 11 so that when the nut body is received in the pocket the end face 12 will be in an exposed relation at or above the top of the workholder member 26.

Figure 5:
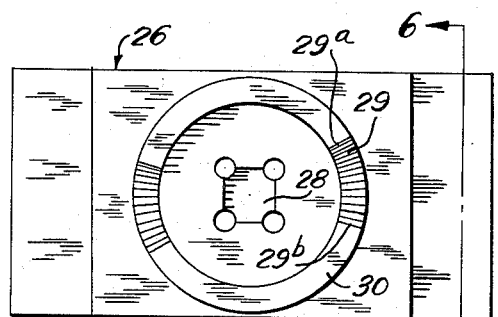
FIG. 5 is a top plan view of the workholder member of the die apparatus, the view being taken as indicated by the directional line 5—5 of FIG. 4.
Figure 6:
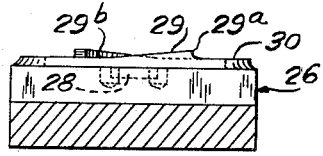
FIG. 6 is a sectional view taken through the workholder member on section line 6—6 of FIG. 5.

For a purpose to be explained hereinafter the workholder member 26 is also provided with arcuately extending cam elements 29 of varying height, in this instance two such cam elements, lying at diametrically opposed points on a circular cam track 30 extending around the pocket 28 as shown in FIG. 5. Each of the cams 29 has a high end 29ª and a low end 29ᵇ of which the latter end merges into the flat surface of the cam track 30.

The punch member unit 27 is adapted to be carried and actuated by a movable member or slide 31 of the punch press, or other power apparatus by which the die mechanism is actuated, and is movable by the slide toward and away from the work support member 26 for operating on a nut blank 11 received in the pocket 28 of the latter. The punch unit 27 comprises a punch holder in the form of a socket member 32 having a cup-shaped socket 33 extending axially thereinto from the lower end thereof, and a punch in the form of a plunger member 34 which is axially and rotatably movable in such socket.

The socket member 32 is provided with a shoulder 21 adjacent its upper end against which the slide 31 exerts its downward thrust and includes a stem portion 35 which is suitably secured in an opening of the slide. The socket member 32 is also provided with an axial passage 36 extending thereinto and formed as an upward continuation of the socket 33 but which is of a smaller transverse dimension than the socket so that the upper end of the socket provides an annular thrust surface or shoulder 37 on the socket member 32 interiorly thereof and in surrounding relation to the passage 36.

Figure 10:
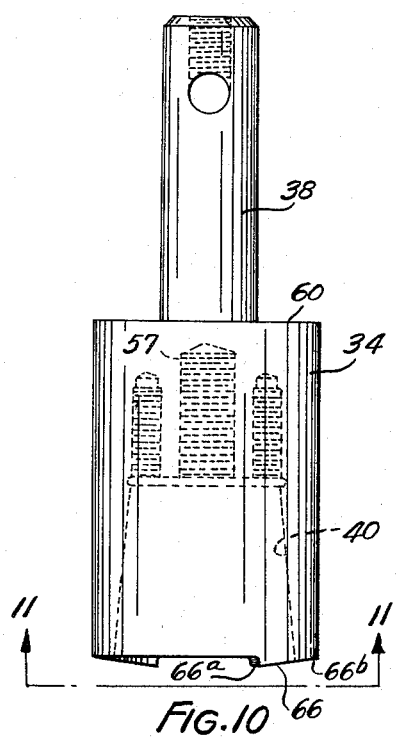
FIG. 10 is a side elevation showing the plunger component of the punch member in detached relation.
Figure 11:
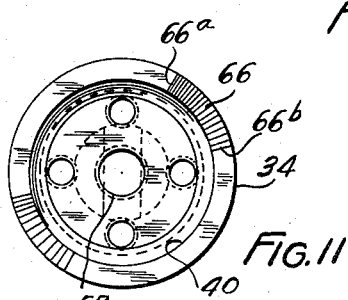
FIG. 11 is an end view of the lower end of the plunger component of the punch member, the view being taken as indicated by the directional line 11—11 of FIG. 10.

The plunger member 34 is of a size and shape transversely thereof to be slidable in the socket 33 and is of a length so that the lower end of this member projects from the socket as shown in FIG. 4. The plunger member 34 includes an axial stem projection 38 on the upper end thereof which is slidably received in the passage 36. As shown in FIGS. 4 and 10, the plunger member 34 is provided in the lower end thereof with an axial socket 40 extending thereinto and which is of a circular cross-sectional shape but has an axially inwardly converging taper.

A pair of tapered segments or jaws 41 and 42 are disposed in the tapered socket 40 and co-operate with the socket wall in forming a chuck for holding a group of gouging die members 43, in this case four such die members. The jaws 41 and 42 are retained in the tapered socket 40 by connecting screws 45 by which the jaws can be drawn into the socket for producing a closing and clamping action of the jaws against the gouging dies 43.

The gouging dies 43 are hardened insert members in the form of rods of a square cross-sectional shape so that when these dies are assembled into a group, as shown in FIGS. 4 and 7, they will substantially fill a central axial square passage 46 formed by co-operating complemental grooves 47 provided in the adjacent portions or faces of the jaws 41 and 42. Each of the gouging dies 43 is provided at the outer or lower end thereof with a gouge-forming element 50 so that when these dies are assembled in the plunger member 34 of the punch unit 27 in the relation explained above, the elements 50 will be in an annular group surrounding the central axis of the punch member to correspond with the arrangement described above for the gouged recesses 17 of the nut body 11.

Each gouge-forming element 50 is of a triangular shape having an apex 50ª at one end thereof and a base 50ᵇ at the other end. The element 50 is substantially V-shaped in cross-section having a longitudinal ridge 51 along the top thereof and side faces extending in diverging relation away from such ridge. The element 50 is formed as an integral tool portion of the die member 43 and extends in an axially projecting relation from a flat lower end face 52 of the latter.

The end face 52 is of a triangular shape representing approximately one-half of the total area of the outer end of the gouging die 43 and lies on one side of a line 53 extending diagonally across the outer end of this die member, as shown in FIG. 13. The end portion lying on the other side of the diagonal line 53 is also a flat surface 54 which serves as a flattening surface for forming the flattened top 16ª on the welding lug 16. The flattening surface 54 is formed on the gouging die 43 so as to be parallel with the flat face 52 but displaced thereabove a distance equal to the desired final height of the welding lug 16, as shown in FIG. 12.

The gouge-forming element 50 is of an axial length, that is, projects for a distance beyond the flat end face 52 of the die member 43, equal substantially to the desired depth of the recess 17 to be gouged into the nut body 11. The depth of the recess 17, on the other hand, is such that the amount of metal which will be gouged therefrom by the element 50 will be sufficient to form the welding lug 16 when the displaced metal is pushed along the recesses being formed and is upset at the base end of the recess. The element 50 has a flat triangular end face 56 on the end thereof corresponding with the base end 50ᵇ of the triangular shape of the element, and which flat end face lies in the plane of the diagonal line 53.

When the gouging dies 43 are assembled in the plunger member 34, the lower ends of the dies project from the gripping passage 46 of the jaw members 41 and 42 so that the gouge-forming elements 50 will be in an exposed relation for penetrating into the nut body 11 when the punch unit 27 is moved to a closed position relative to the workholder member 26. The extent to which the gouging dies 43 project from the jaws 41 and 42 can be varied and, for this purpose, the plunger member 34 is provided centrally thereof with a threaded opening 57 and an abutment screw 58 engaged in such threaded opening.

The lower end of the abutment screw 58 forms a thrust seat 58ª which is engaged by the inner ends of the gouging dies 43 for transmitting thrust to the latter. The axial position of the screw 58 can be adjusted in the threaded opening 57 to vary the location of the seat 58ª, and consequently, the extent to which the gouging dies 43 project from the plunger member 34.

The plunger member 34 normally projects from the socket 33 of the socket member 32 under the influence of a spring means provided in the socket 33 and effective against an annular shoulder 60 provided on the plunger member in surrounding relation to the reduced axial stem 38 of the latter. The spring means is here shown as comprising groups of concave spring washers 61 mounted on the reduced stem 38 and effective between the annular shoulder 60 and a hardened insert washer 62 provided in the socket 33 and forming an upper spring seat adjacent the annular shoulder 37.

When a nut body 11 has been placed in the socket 28 of the workholder member 26 and the punch unit 27 is moved into closing co-operation with the workholder member, axial thrust will be transmitted from the socket member 32 to the plunger member 34 through the spring means 61 to cause the elements 50 to be penetrated into the nut body. The characteristics of the spring means 61 are such that the force applied to the punch member 27 for causing penetration of the elements 50 into the nut body will produce deflection, or partial deflection, of the spring means and the resulting relative axial movement between the socket member 32 and the plunger member 34 is utilized to cause the rotative movement of the latter.

For the purpose of producing the rotative movement of the plunger member 34, the socket member 32 is provided with helical cam slots 64 therein which extend in a direction transversely of the longitudinal axis thereof. The plunger member 34 is provided with cam follower means for co-operation with the cam slots 64 and which follower means is here shown as being a transverse pin 65 mounted in the stem 38 and extending transversely thereof so that the outer ends of the pin operate in the cam slots 64.

During the above-mentioned axial movement of the socket member 32 relative to the plunger member 34 while the elements 50 are being forced into the nut body 11, the cam slots 64 will be effective against the pin 65 to produce rotation of the plunger member relative to the socket member in a direction to cause the end faces 56 of the gouging elements 50 to push the gouged metal along the recesses from which it is being gouged and to be upset into the welding lugs 16.

Since the rotative movement imparted to the socket member 34 is dependent upon a flexing of the spring means 61, it is desirable to provide the die apparatus with means for controlling the penetration of the gouging elements 50 into the nut body 11 and for insuring a proper compression loading and deflection of the spring means. For this purpose the socket member 34 is provided on the lower end thereof with a pair of cam follower elements 66 for engagement with the cam elements 29 of the workholder member 26.

The cam follower elements 66 are of a tapered shape having high and low ends 66a and 66b and co-operate with the cam elements 29 so as to resist the downward movement of the plunger member 34 but to permit such downward movement when sufficient loading of the spring means 61 has taken place. The slope of the cam follower elements 66 is the reverse of the cam elements 29 so that, as the loading of the spring means 61 increases progressively in response to the closing of the punch member 27 relative to the work support member 26, the co-operation of the cam slots 64 with the follower pin 65 will cause a progressive rotation of the plunger member 34 concurrently with the closing movement of the latter relative to the workholder member 26.

From the operation of the die apparatus as described above, it will be seen that as the punch member 27 closes against the workholder member 26, the gouging elements 50 will be axially and rotatively penetrated into the nut body 11 to form the gouged recesses 17 of a progressively increasing depth and to push the displaced metal along the recesses and thereby upset the metal into the welding lugs 16. By the time that the elements 50 have been penetrated and rotated to the desired extent, the flattening faces 54 of the gouging dies 43 will have become effective against the tops of the welding lugs to form the flat top surfaces 16a thereon.

Opening movement of the punch unit 27 relative to the workholder member 26 first causes a retracting axial movement of the socket member 32 while the gouging dies 43 are still under the load effect of the spring means 61. During this initial retracting movement of the socket member 32 a combined axial and rotative retracting movement of the plunger member 34 takes place by reason of the expansive action of the spring means 61 causing movement of the cam follower pin 65 along the cam slots 64. Further opening movement of the punch unit 27 separates the same from the workholder member 26 to permit the removal of the completed nut.

The plunger member 34 is retained in the socket member 32, preferably with the spring means 61 under a desired initial compression load, as by means of a retaining screw 68 provided in the upper portion of the socket member and having a threaded engagement with the stem portion 38 of the plunger member.

It will now be readily understood, from the accompanying drawings and the foregoing detailed description, that this invention provides a novel form of weld nut which can be rapidly and economically produced, and also provides a novel method and die apparatus for thus producing the novel weld nut. It will also be seen that the die apparatus is of a simple construction and will operate in a positive manner to produce weld nuts whose welding lugs will always be of a desired size, shape and location on the nut body. It will also be seen that the die apparatus can be used in a conventional punch press and will have a long die life with minimum need for servicing or replacement of the die members thereof and, moreover, it will be seen that the weld projections will be formed on the nut body in a manner and in a location such that there will be no undesirable distortion of the nut body or of the threaded tap opening thereof.

Although the weld nut and the method and apparatus for producing the same as provided by this invention have been illustrated and described herein to a somewhat detailed extent it will be understood, of course, that the invention is not to be regarded as being limited correspondingly in scope but includes all changes and modifications coming within the terms of the claims hereof.

Having described our invention, we claim:

1. In die apparatus for use in a punch press for forming welding lug projections on a nut; a work support member adapted to hold a nut body having a flat end face and a tap opening extending into the body from said face substantially centrally of the body; a punch unit movable toward and away from said support member along the axis of said opening and comprising a holder member and a punch member having limited axial and rotary movements relative to said holder member; gouge-forming elements on said punch member for engagement with said face and disposed in an annular group around said axis; and means for causing concomitant closing and rotational movement of said punch member relative to said support member for rotatively penetrating said elements into said body including co-operating cam and cam follower elements connected with said holder member and punch member and effective to produce the limited rotary relative movement of said punch member in response to the limited relative axial movement between said holder member and punch member.

2. Die apparatus as defined in claim 1 wherein said gouge-forming elements are axial projections on said punch member and are spaced at substantially 90 degree locations on a circle extending around said axis; each of said elements being a ridge having its length extending along a portion of said circle and having a tapering height lengthwise of the element; said elements having flat thrust surfaces thereon at one end thereof and extending transversely of the ridge; said thrust surfaces all facing in the same rotational direction around said circle, and each element being substantially V-shaped in cross-section transversely of its length.

3. In die apparatus for use in a punch press for forming welding lug projections on a nut body; a work support adapted to hold the nut body; a punch unit supported for axial closing and opening movements relative to said support; said punch unit comprising a holder member and a punch member having limited axial and rotary movements relative to said holder member; means effective on said punch unit for concomitantly producing closing and rotational movements of said punch member including co-operating cam slot and pin elements connected between said holder member and punch member for producing the limited rotary relative movement of said punch member in response to limited relative axial movement between said holder member and punch member; means engageable between said work support and punch unit for limiting the closing movement of said punch unit; die means carried by said punch member comprising a group of arcuately extending and annularly spaced axially projecting gouging elements on the lower end thereof for rotative gouge penetration into the nut body during the closing and rotational movements of said punch member; said elements being spaced apart at substantially 90 degree locations in said annular group; each of said elements being a ridge having its length extending along a portion of a circle and having a tapering height lengthwise of the element; said elements being substantially V-shaped in cross-section transversely thereof, and having flat transverse thrust surfaces thereon at the leading ends thereof with respect to the gouging rotational movement of said punch member, said elements being spaced apart at substantially 90 degree locations in said annular group; each of said elements being a ridge having its length extending along a portion of a circle and having a tapering height lengthwise of the element; said elements being substantially V-shaped in cross-section transversely thereof, and having flat transverse thrust surfaces thereon at the leading ends thereof with respect to the gouging rotational movement of said punch means for pushing gouged metal and upsetting the same into said lug projections; and flattening surfaces on said lower end in laterally adjacent relation to said elements and engageable with said lug projections for flattening the tops thereof.

4. The method of making weld nuts which comprises supporting a nut body having an end face and a tap opening extending into the body from said end face, providing a die punch having an annular group of gouge-forming elements, pressing said elements into said face in surrounding relation to said opening and meanwhile relatively rotating said punch and body for displacing portions of the metal of the body by forming gouges in the latter, causing a progressively deeper penetration of said elements into said face in relation to the relative rotation between said body and punch, pushing the displaced metal along the gouges being formed and toward the deep ends thereof, and upsetting the displaced metal into welding lugs projecting from said end face and rising thereabove so as to be comprised to a major extent of metal displaced from said deep ends of the gouges and, in the same operation, flattening the tops of said lugs.

References Cited in the file of this patent

UNITED STATES PATENTS

| | | |
|---|---|---|
| 1,952,305 | Beck | Mar. 27, 1934 |
| 2,037,586 | Olson | Apr. 14, 1936 |
| 2,088,978 | Serra | Aug. 3, 1937 |
| 2,112,494 | Olson | Mar. 29, 1938 |
| 2,128,757 | Olson | Aug. 30, 1938 |
| 2,761,483 | Richardson | Sept. 4, 1956 |

FOREIGN PATENTS

| | | |
|---|---|---|
| 737,502 | Great Britain | Sept. 28, 1955 |